US011697080B2

(12) United States Patent
Thiessen et al.

(10) Patent No.: US 11,697,080 B2
(45) Date of Patent: Jul. 11, 2023

(54) PORTABLE POOL FILTER CLEANING SYSTEM AND METHOD OF CLEANING A POOL FILTER (71) Applicant: Jordan Thiessen, Murfreesboro, TN (US)

(72) Inventors: Jordan Thiessen, Murfreesboro, TN (US); Jeff Thiessen, Murfreesboro, TN (US)

(73) Assignee: CYCLONE FILTER TOOLS LLC, Murfreesboro, TN (US)

( * ) Notice: Subject to any disclaimer, the term of this patent is extended or adjusted under 35 U.S.C. 154(b) by 0 days.

(21) Appl. No.: 17/637,921

(22) PCT Filed: Oct. 4, 2021

(86) PCT No.: PCT/US2021/053337
§ 371 (c)(1),
(2) Date: Feb. 24, 2022

(87) PCT Pub. No.: WO2022/072920
PCT Pub. Date: Apr. 7, 2022

(65) Prior Publication Data
US 2022/0370932 A1 Nov. 24, 2022

Related U.S. Application Data (60) Provisional application No. 63/087,208, filed on Oct. 3, 2020.

(51) Int. Cl.
B01D 24/46 (2006.01)
E04H 4/16 (2006.01)
(Continued)

(52) U.S. Cl.
CPC ......... B01D 24/4636 (2013.01); B01D 29/21 (2013.01); B01D 41/04 (2013.01);
(Continued)

(58) Field of Classification Search
CPC .... B01D 24/4636; B01D 29/21; B01D 41/04; B01D 2201/583; E04H 4/16; F16M 11/247; F16M 2200/08; B05B 13/0228
(Continued)

(56) References Cited

U.S. PATENT DOCUMENTS 4,299,245 A 11/1981 Clapper
4,834,883 A 5/1989 Lake
(Continued)

FOREIGN PATENT DOCUMENTS

WO WO 2013/134400 A1 * 9/2013

Primary Examiner — Fred Prince
(74) Attorney, Agent, or Firm — Invention To Patent Services; Alex Hobson (57) ABSTRACT A portable pool filter cleaning assembly is configured to retain a pool filter on support rod and allow the pool filter to spin from a spray of water. The spinning filter releases debris from the filter surface through centrifugal force. The assembly has drainage features to ensure proper drainage of water collected within the interior of the pool filter and enable proper spinning from the spray of water. The assembly utilizes a support rod with a bottom filter retainer that is conical in shape for engaging with the pool filter aperture. The bottom filter retainer may further have a bearing that enables the pool filter to rotate freely about the rod with very little force. The assembly may include a stand for securing the support rod on a hard surface, such as concrete or on an uneven lawn surface.

33 Claims, 10 Drawing Sheets (51) Int. Cl.
*F16M 11/24* (2006.01)
*B01D 29/21* (2006.01)
*B01D 41/04* (2006.01)
*B05B 13/02* (2006.01)

(52) U.S. Cl.
CPC ............ *E04H 4/16* (2013.01); *F16M 11/247* (2013.01); *B01D 2201/583* (2013.01); *B05B 13/0228* (2013.01); *F16M 2200/08* (2013.01)

(58) Field of Classification Search
USPC ..... 210/269, 167.1, 232, 391, 409; 134/152; 4/496
See application file for complete search history.

(56) References Cited

U.S. PATENT DOCUMENTS

| | | |
|---|---|---|
| 5,330,065 A | 7/1994 | Bradley |
| 5,384,045 A | 1/1995 | Chmielewski |
| 5,989,419 A | 11/1999 | Dudley et al. |
| 6,156,213 A | 12/2000 | Dudley et al. |
| 6,709,581 B2 | 3/2004 | Leckal |
| 8,997,999 B1 | 4/2015 | DeRenzis et al. |
| 9,675,910 B1 | 6/2017 | Wade et al. |
| 2011/0226291 A1 | 9/2011 | Toussalnt |
| 2013/0105374 A1* | 5/2013 | Hegi ................. C02F 1/001 210/167.1 |
| 2016/0031953 A1 | 11/2016 | Fima |
| 2016/0319532 A1 | 11/2016 | Fima |
| 2018/0065066 A1 | 2/2018 | Morris et al. |
| 2019/0344205 A1* | 11/2019 | Hicks ................. B08B 9/00 |

* cited by examiner

PORTABLE POOL FILTER CLEANING SYSTEM AND METHOD OF CLEANING A POOL FILTER

CROSS REFERENCE TO RELATED APPLICATIONS

This application claims the benefit of priority to U.S. 63/087,208, filed on Oct. 3, 2020; the entirety of which is hereby incorporated by reference herein.

BACKGROUND OF THE INVENTION

Field of the Invention

The invention relates to a portable pool filter cleaning system that utilizes a portable pool filter cleaning assembly having drainage features to prevent collection of water within the pool filter during cleaning and that can be used on a hard surface, such as concrete or on an uneven lawn surface.

Background

Cleaning pool filters is a messy and difficult job. Cartridge style pool filters are most often pleated filters and removing debris from the between the pleats is difficult. Some devices have been described for spinning the filter in an effort to use centrifugal force to remove the debris from the pleats but these devices are limited in their use as they are not easily secured and used on various surfaces. In addition, the pool filters collect water from the cleaning spray of water and become heavy. Ineffective drainage of water from the interior of the pool filter can prevent the pool filter from spinning.

SUMMARY OF THE INVENTION

The invention relates to a portable pool filter cleaning system that utilizes a portable pool filter cleaning assembly having drainage features to prevent collection of water within the pool filter during cleaning and that can be used on a hard surface, such as concrete or on an uneven lawn surface.

The portable pool filter cleaning assembly comprises a support rod with a bottom filter retainer that includes a conical retainer having a conical shape for engaging with the pool filter aperture. Pool filters typically are cylindrical in shape and have an aperture on one end for the flow of water through the filter.

The conical retainer of the bottom filter retainer may be configured with drainage slots to allow water from within the interior of the pool filter to drain out during cleaning. In addition, a bottom filter retainer may have an interior drainage feature that enables water from the interior of the pool filter to flow down along the support rod, between the bottom filter retainer and the support rod and out. An interior drainage feature may be a slot or groove that extends along a portion of the conical retainer, for example. Without proper drainage, water may be trapped within the pool filter and may prevent proper cleaning and may make the filter heavy and thereby more likely to tip over. In addition, a pool filter that collects water in the interior from a cleaning stream of water may become difficult to spin from the stream of water. Therefore, proper and effective draining is important for the cleaning method to work properly.

The bottom filter retainer may further comprise a bearing that enables the pool filter to rotate freely about the rod with very little force. A bearing may include ball bearings to provide low friction engagement with the support rod. A bottom filter retainer may be retained on the support rod by a support setter that is configured to be fixed in a vertical position to the rod. A support setter may rest on the bearing or may extend up between the bearing and the support rod to create a firm seat for the bearing inside surface on the support setter. This arrangement may prevent undesirable motion of the bearing and bottom filter retainer and thereby provide smoother and lower friction spinning of the pool filter. A pool filter retained on the conical retainer and retained by the support setter may be effectively centered around the support rod to provide smooth spinning of the pool filter around the support rod from a jet of water.

An exemplary support setter may have slip teeth that extend up to engage with bottom filter retainer such as on the bottom surface of the bottom filter retainer or preferably between the bottom filter retainer and the support rod. The slip teeth have clamp ports configured between the slip teeth to enable water to drain from the interior of the bottom filter retainer, through the interior drainage feature along the conical retainer and out through said clamp ports. This arrangement of the bearing configured with the conical retainer and the slip teeth engaging with the bearing may effectively reduce friction and allow the pool filter to spin more freely from a stream of water, such as spray or jet of water from a hose or hose nozzle. The bearing may also be formed by the bottom retainer resting and spinning on a pin extending through the support rod. A water spray from a hose can be used to clean debris from the filter and cause the filter to spin about the support rod. The spinning of the filter about the support rod may further improve the cleaning process as the debris may be flung out from between the pleats due to centrifugal force.

A support rod of an exemplary portable pool filter cleaning system may be configured with a spike on the bottom end for inserting the support rod down into a lawn surface, such as pool owner's yard. A spike is a tapering of the support rod to the bottom of the support rod. The spike may be conical in shape and taper to a point to enable insertion into the ground. A hammer plate may be used to secure the support rod into a ground surface. A hammer plate comprises a plate-rod receiver, such as a short cylinder to retainer the hammer place on the top of the support rod. A support rod may also be secured in a ground sleeve that is first configured in a ground surface. A ground sleeve may be a cylindrical shape having a ground sleeve spike at the bottom to enable the ground sleeve to be inserted into the ground. Again, the hammer plate may be used and secured over the top of the ground sleeve for insertion into a ground surface. Alternatively, a support rod may be placed into a hole, such as a hole in the decking around the pool. A hole may also be created by drilling into the decking or other surface for insertion of the support rod.

An exemplary portable pool filter cleaning assembly also comprises a stand that enables the support rod to be secured in the stand, through the stand aperture on hard surfaces, such as the deck around the pool, which is often concrete. The portable pool filter cleaning assembly provides versatility in supporting the pool filter on various surfaces. In some cases, the pool filtration system is located within an enclosed area and there is no easy access to a lawn surface. In this case, the pool filter can be cleaned on the decking around the pool. The pool filter may also be cleaned away from the pool area by inserting the support rod into the lawn surface, thereby preventing the splatter of debris from the pool filter on the decking around the pool or into the pool.

An exemplary stand is a collapsible stand, wherein the support legs of the stand can be collapsed or folded back together for transport. The support legs can be pulled out to provide a secure base support for the support rod.

An exemplary stand has a stand base and a rod receiver for receiving the bottom of the support rod therein. A rod receiver may be cylindrical in shape with a top aperture. The stand base may have a planar bottom surface and may be rectangular in shape, and large enough to effectively secure the filter in an upright position on the support rod.

A top filter retainer is detachably attachable to the support rod and can be slid down over the filter to secure the filter in place. The top filter retainer, and in some cases the bottom filter retainer, may have a support setter, or a means to lock the retainer in a position along the support rod. A support setter may be a collar that can be manipulated to release the retainer for sliding along the support rod and then released to secure the retainer in place. A support setter may have a clamp with a clamp knob that can be turned to tighten the collar or clamp onto the support rod. A support setter may have a separation that when tightened by a clamp is reduced to squeeze the support setter onto the rod to fix it in position. Another type of support setter may be a set screw that extends through the retainer and engages directly with the support rod. The conical retainer may be secured along the support rod by a pin that extends through the support rod. In an exemplary embodiment, the bottom conical retainer rest and spins on the support pin during the cleaning process. A support rod may have a plurality of pin apertures to accommodate filters of different heights. The bottom filter retainer may form a bearing spinning on the pin.

Filters may come in a variety of sizes and it may be desirable to move the support setter to accommodate filters of different lengths. The support rod may be cylindrical in shape and accommodate sliding of the support setter as well as the bottom and top support retainers along the support rod.

An exemplary pool filter cleaning assembly is portable, wherein the components can be carried by a single person to and from a pool location.

An exemplary pool filter cleaning assembly is configured to retain a pool filter substantially vertically or with the support rod and length axis of the pool filter extending within 25 degrees of a vertical axis and preferably within about 10 degrees of said vertical axis to provide stability as the pool filter spins about the support rod.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

shows a perspective view of an exemplary conical retainer having drainage slots extending from the top to the bottom.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
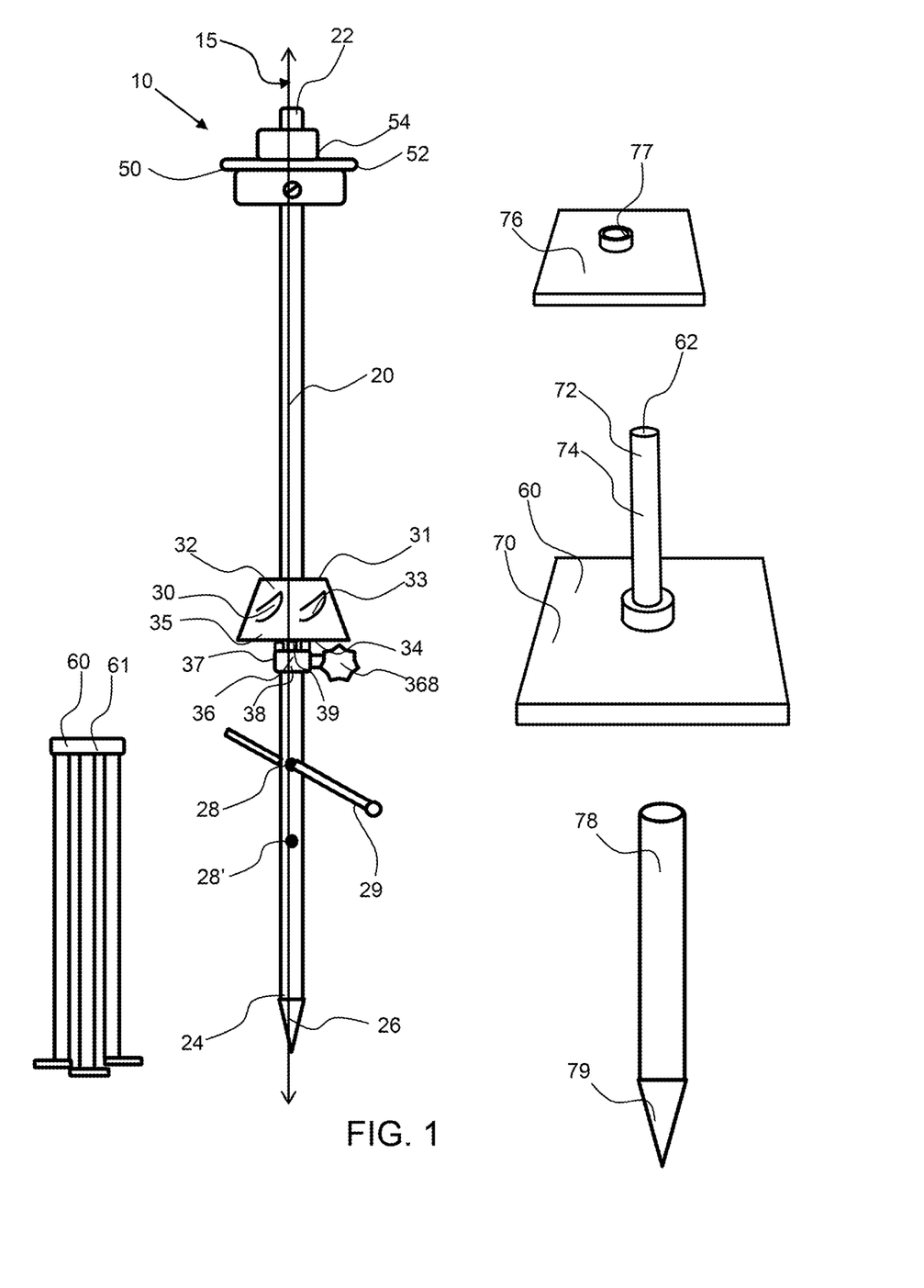
FIG. 1 shows a side view of an exemplary portable pool filter cleaning assembly that includes a support rod, a bottom filter retainer and a top filter retainer each having bearings to enable the pool filter to rotate when sprayed with water, as well as a stand, a ground sleeve and a hammer plate.
Figure 2:
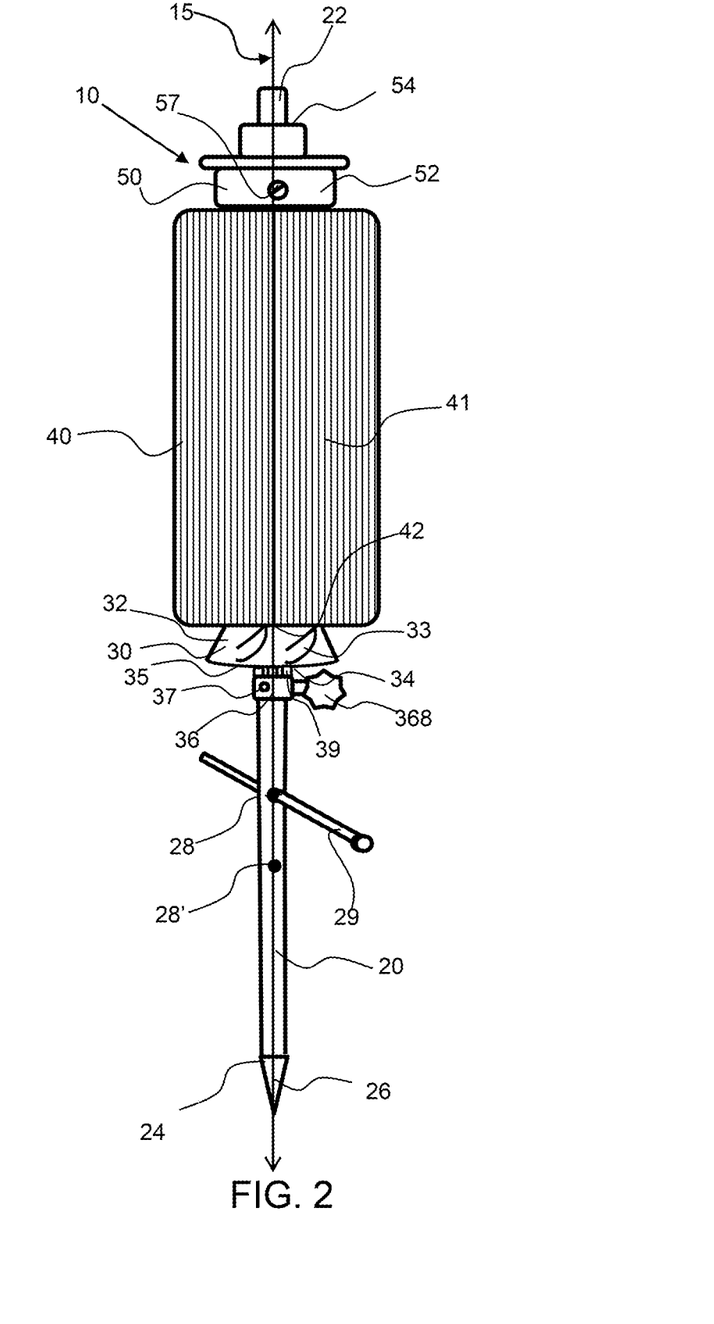
FIG. 2 shows a side view of an exemplary portable pool filter cleaning assembly with a pool filter retained thereon.

Referring to FIGS. 1 and 2, an exemplary portable pool filter cleaning assembly 10 includes a support rod 20, a bottom filter retainer 30 and a top filter retainer 50 each having bearings, 34, 54, respectively to enable the pool filter 40 to rotate when sprayed with water. The assembly also includes a stand 60, which may be a retractable stand 61, or a stand 60' having a stand base 70 and rod receiver 72. The assembly also comprises a hammer plate 76 with a plate-rod receiver 77 for retaining the hammer plate over the top 22 of the support rod 20 to hammer the bottom spike 26 of the support rod into a ground surface and/or over the top of the ground sleeve 78, to insert the ground sleeve into a ground surface.

The exemplary portable pool filter cleaning assembly 10 is configured to enable the pool filter to spin or rotate about the support rod when sprayed with a stream of water from a hose. The support rod is configured to extend substantially vertically, or within about 25 degrees of a vertical axis 15, and preferably within about 10 degrees or even 5 degrees, to provide stability as the pool filter spins about the support rod. The bottom filter retainer 30 and the top filter retainer 50 therefore may have bearings 34 and 54, respectively, to enable the filter to spin. The bearing(s) may comprise ball bearings to enable the filter to spin with very little force about the support rod. A bearing may be a reduced diameter from the bottom of the conical retainer and the bearing may be an integral part of the conical retainer, wherein the conical retainer and the bearing are a monolithic part. The bearing 34 of the bottom filter retainer 30, may rest on the pin 29 and spin about the pin during cleaning or may rest on the support setter 36. The support setter may have slip teeth that extend up from the support setter to engage with the bottom of the bottom filter retainer, such as on the bearing 34 surface or race of the bearing to provide reduced friction and allow the bottom filter retainer to spin freely about the bearing. The bottom support setter 36 has a clamp 38 that is squeeze onto the rod 20 when the clamp knob 368 is turned.

The support rod may have a plurality of pin apertures 28, 28' to accommodate filters of different sizes with the pin 29 configure into the various apertures. The bottom filter retainer may act as or form a bearing spinning on the pin.

Figures 4, 5:
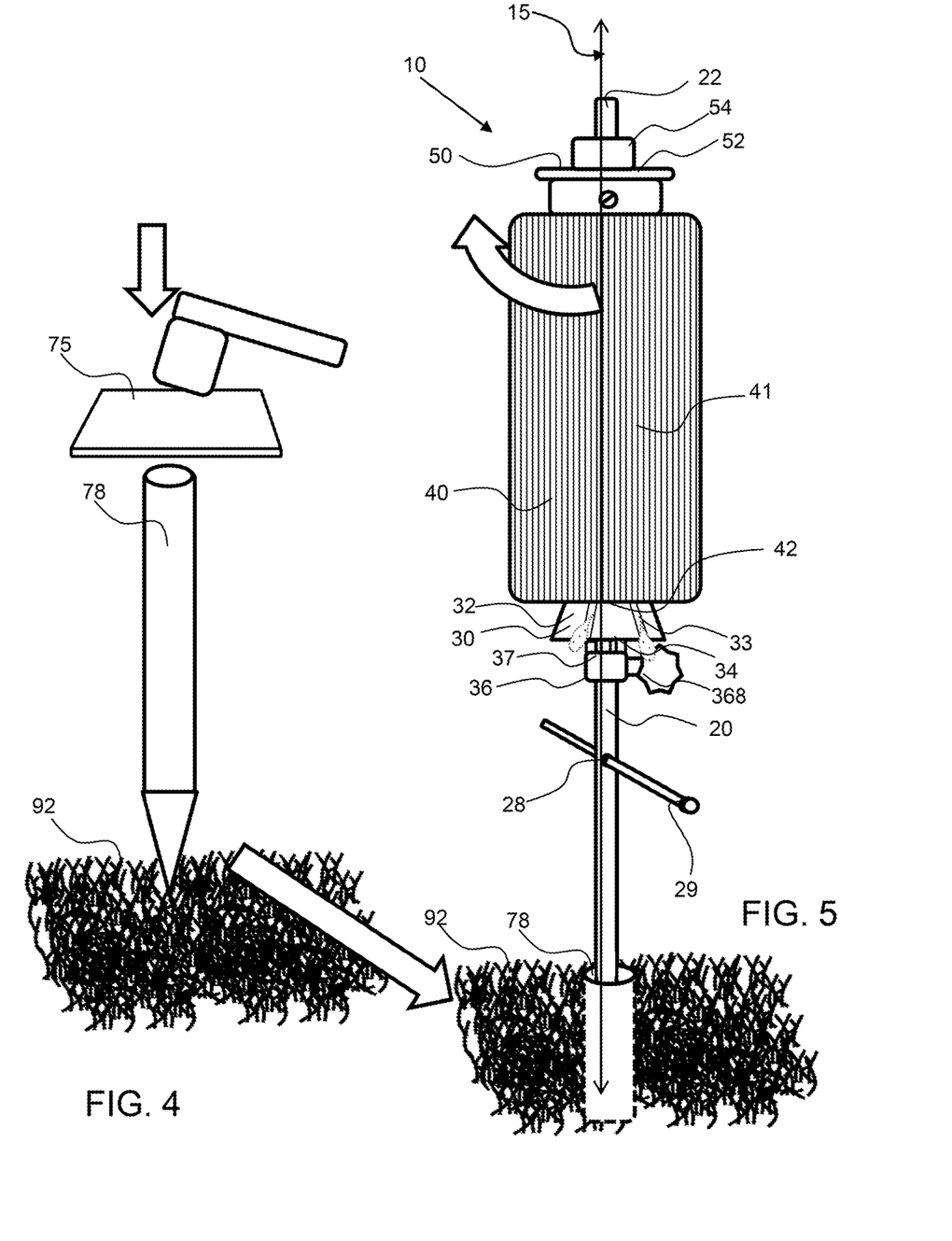
FIG. 4 shows a side view of a ground sleeve being hammered into a ground surface using the hammer plate.
FIG. 5 shows the ground sleeve configured in the ground surface and the support rod retained within the ground sleeve to support the pool filter on the support rod during cleaning.

The bottom filter retainer 30 comprises a conical retainer 32 for insertion into the filter aperture 42 of the pool filter 40, and a bearing 34 to enable the pool filter to rotate about the rod. The bottom retainer also has a support setter 36, such as a collar or set screw 37 to secure the bottom retainer in a fixed position along the support rod. When the bottom retainer is configured to rest on the pin 29 and rotate about the pin, a support setter such as a collar or set screw may not be required. The conical retainer 32 of the bottom filter retainer may comprise drainage slots 33, as shown in FIG. 5 to enable water and debris from the interior of the pool filter to drain out during cleaning. The top filter retainer 50 may comprise a top retainer 52 which may also be a conical retainer and a bearing 54. Again, the top filter retainer has a support setter 56, such as a collar or set screw 57 to secure the bottom retainer in a fixed position along the support rod. The support rod has a length from the top 22 to the bottom 24 and a bottom spike 26 may enable the rod to be inserted into a lawn surface to secure the support rod in a vertical position for pool filter cleaning. The bottom spike may be detachably attachable to the rod. A pin aperture 28 in the support rod is configured to retain a pin 29 which may act as a stop for the conical retainer to rest and be supported. The exemplary portable pool filter cleaning assembly 10 comprises a stand 60, such as a collapsible stand 61, shown in a collapsible configuration in FIG. 1.

Figure 3:
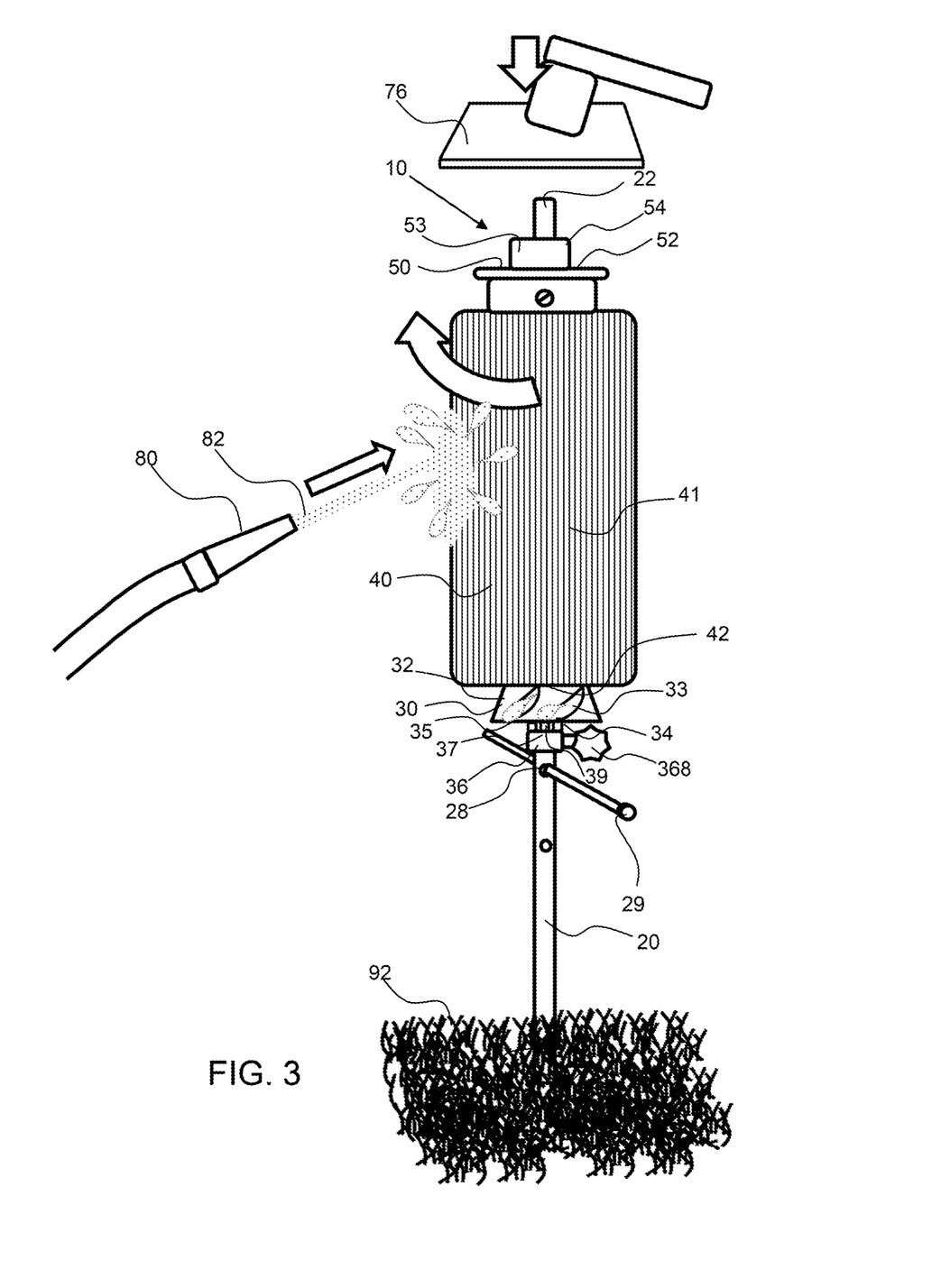
FIG. 3 shows a side view of an exemplary portable pool filter cleaning assembly secured in a lawn surface by the rod and bottom spike.

As shown in FIG. 3, an exemplary portable pool filter cleaning assembly 10 is secured in a lawn surface 92 by the support rod 20 and bottom spike 26. The bottom spike enables easier insertion of the rod into a lawn surface. A hammer plate 76 is configured over the top 22 of the support rod 20 to hammer the support rod into the ground surface. Note that this may be done prior to placing the pool filter 40 over the support rod. A hose 80 is projecting a stream of water 82 onto the pool filter. This causes the pool filter to spin and the centrifugal force releases debris from the pool filter, such as from within the pleats of the filter. Also, the drainage slots 33 in the conical retainer 32 enable drainage of water and debris from the inside of the pool filter. The bearing 34 of the bottom retainer 30 is resting on the support setter 36 to form a bearing to enable the pool filter to spin.

Referring now to FIGS. 4 and 5, an exemplary ground sleeve 78 is being inserted into a ground surface 92, such as a lawn, using the hammer plate 75. A hammer is used to beat the back side of the hammer plate to force the ground sleeve spike 79 and ground sleeve into the ground. The ground sleeve forms an aperture in the ground for receiving the support rod therein as shown in FIG. 5. The ground sleeve may be left in the ground and a cap may be placed over the top opening of the ground sleeve when not in use.

Figure 6:
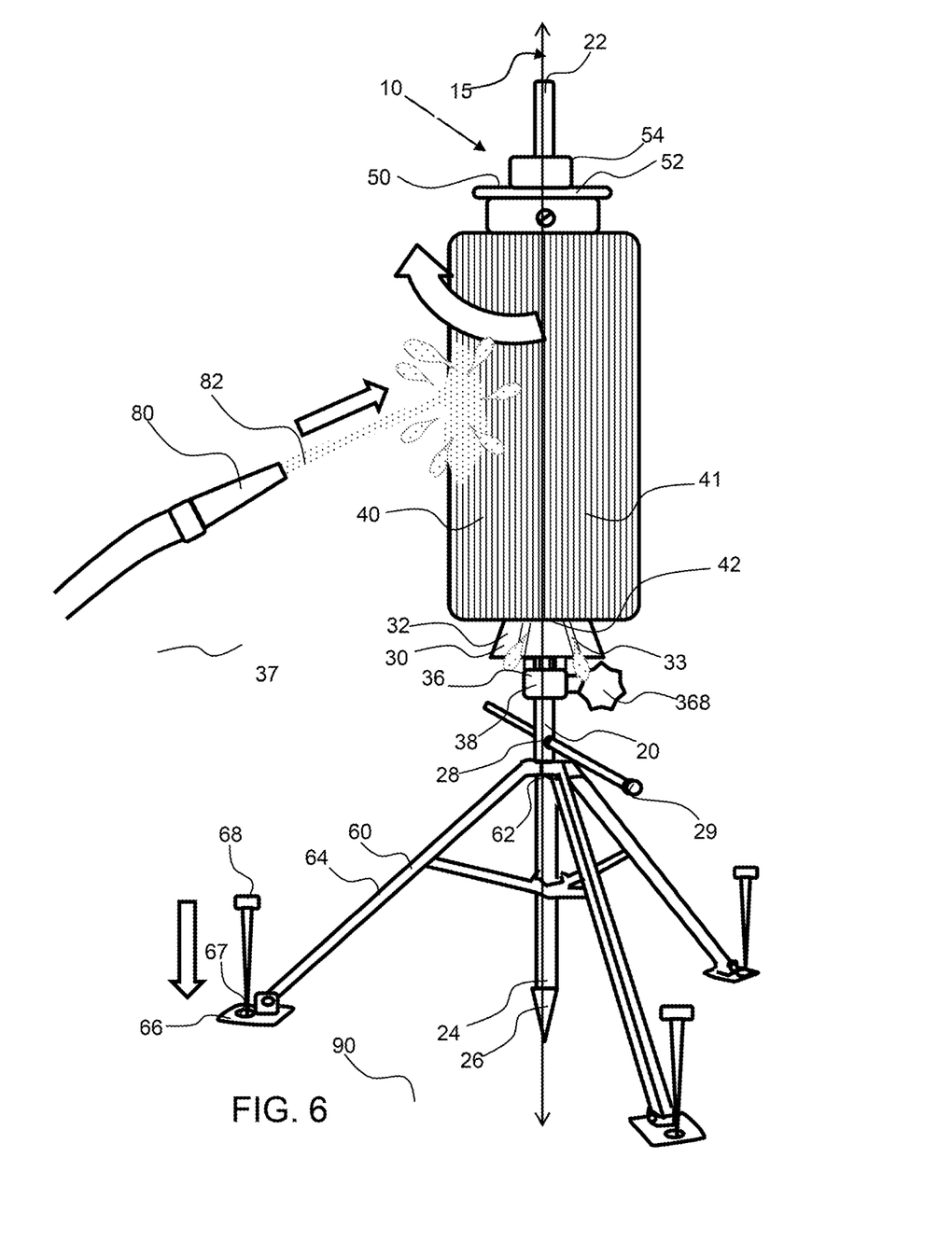
FIG. 6 shows a side view of an exemplary portable pool filter cleaning assembly which includes a support stand for retaining the pool filter on a hard surface, such as on concrete, for cleaning with the spray of a water from a hose.

As shown in FIG. 6, an exemplary portable pool filter cleaning assembly 10 is secured in a stand 60 on a hard surface 90 by the support rod 20 extending through a stand aperture 62. The exemplary stand has three support legs 64 and a support foot 66 configured at the extended end of the support leg to provide stability. The support foot has a foot spike aperture 67 for receiving a foot spike 68 therethrough in the event the stand is configured on a lawn surface. The foot spike may be used to secure the stand when the lawn surface is uneven. Again, a hose 80 is projecting a stream of water 82 onto the pool filter. This causes the pool filter to spin and the centrifugal force releases debris from the pool filter, such as from within the pleats 41 of the filter. Also, the drainage slots 33 in the conical retainer 32 enable drainage of water and debris from the inside of the pool filter.

Figure 7:
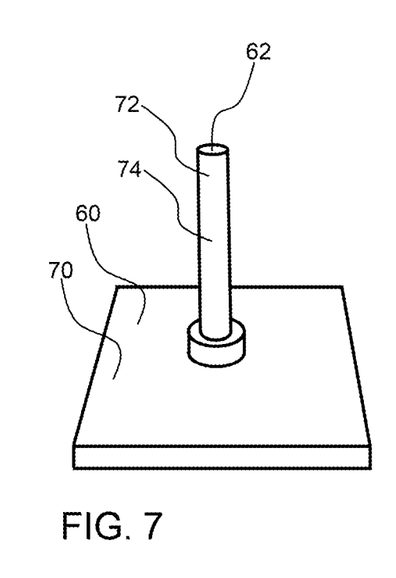
FIG. 7 shows a perspective view of an exemplary support stand for retaining the pool filter on a hard surface, such as on concrete.

As shown in FIG. 7, an exemplary stand 60 comprises a stand base 70 with a rod receiver 72, a receiver cylinder 74, extending up from the stand base. The receiver cylinder has a stand aperture 62 for insertion of the support rod.

Figure 8:
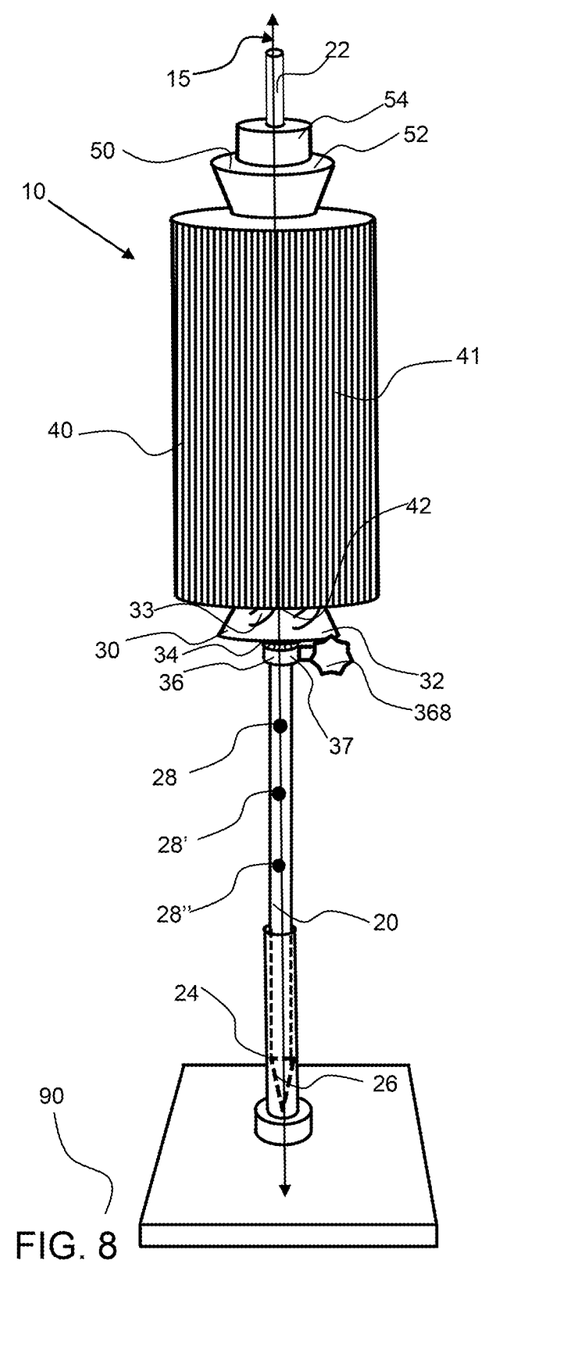
FIG. 8 shows a perspective view of an exemplary portable pool filter cleaning assembly which includes a support stand for retaining the pool filter on a hard surface, such as on concrete, for cleaning with the spray of a water from a hose.

As shown in FIG. 8, an exemplary portable pool filter cleaning assembly 10 is secured in a stand 60 on a hard surface 90 by the support rod 20 extending through into the stand aperture 62. The exemplary stand has a stand base 70, which may have a planar bottom surface and may be rectangular in shape. A rod receiver 72, a receiver cylinder 74, extends up from the stand base to receive the support rod 20. The base may be effectively large enough to prevent the pool filter coupled to the support rod from tipping over.

Figure 9:
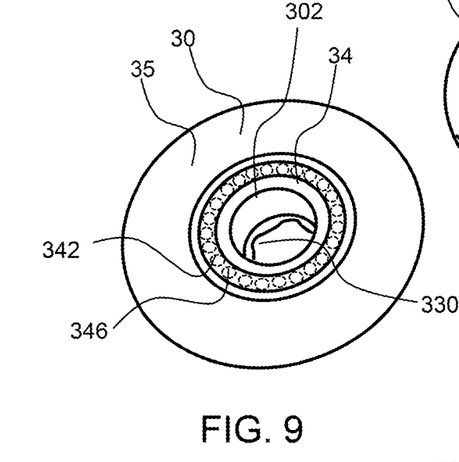
FIG. 9 shows a bottom view of an exemplary bottom filter retainer having a bearing and an inner drainage feature to allow water to flow out from the interior of the pool filter along the rod and out through the rod receiver of the bottom filter retainer.

As shown in FIG. 9, an exemplary bottom filter retainer 30 has a bearing 34 and an inner drainage feature 330 to allow water to flow out from the interior of the pool filter along the rod and out through the rod receiver of the bottom filter retainer. The conical retainer 32 also has drainage slots 33 configured in the outside surface of the conical retainer and as shown the drainage slots extend circumferentially as well as vertically along the conical retainer. These drainage slots may more effectively dispense the water radially away from the conical retainer as the pool filter is rotating from the spray of water.

Figure 10:
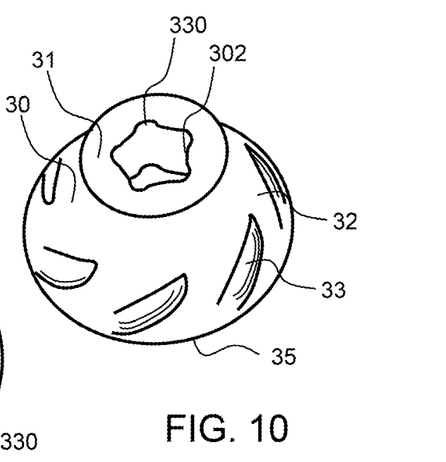
FIG. 10 shows a perspective view of an exemplary bottom filter retainer having a conical shape that tapers toward the top of the conical retainer and drainage slots 33 in the outside surface of the conical retainer as well as inner drainage features configured along the rod receiver of the bottom filter retainer.

As shown in FIG. 10, an exemplary bottom filter retainer 30 has a conical shape that tapers toward the top 31 of the conical retainer and drainage slots 33 in the outside surface of the conical retainer 32 as well as inner drainage features 330 configured along the rod receiver 302 of the bottom filter retainer. The inner drainage features allow water from within the pool filter to flow down through the drainage features between the bottom filter retainer and the rod (not shown).

Figure 11:
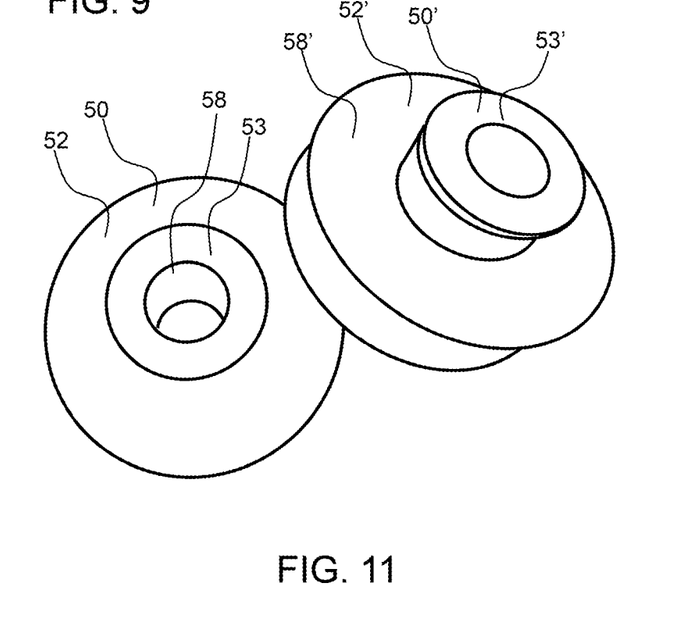
FIG. 11 shows a perspective view of two filter retainers configured to slide down over the rod and over a pool filter configured on the rod.

As shown in FIG. 11, a pair of top filter retainers 50, 50' are configured to slide down over the rod and over a pool filter configured on the support rod. Each of the top filter retainers have a top retainer portion 52, 52' and a handle 53, 53', which is smaller in diameter than the top retainer portion 52. A rod receiver 58 is configured to receive a rod to enable the top filter retainer to slide down on top of a pool filter configured on a rod.

Figure 12:
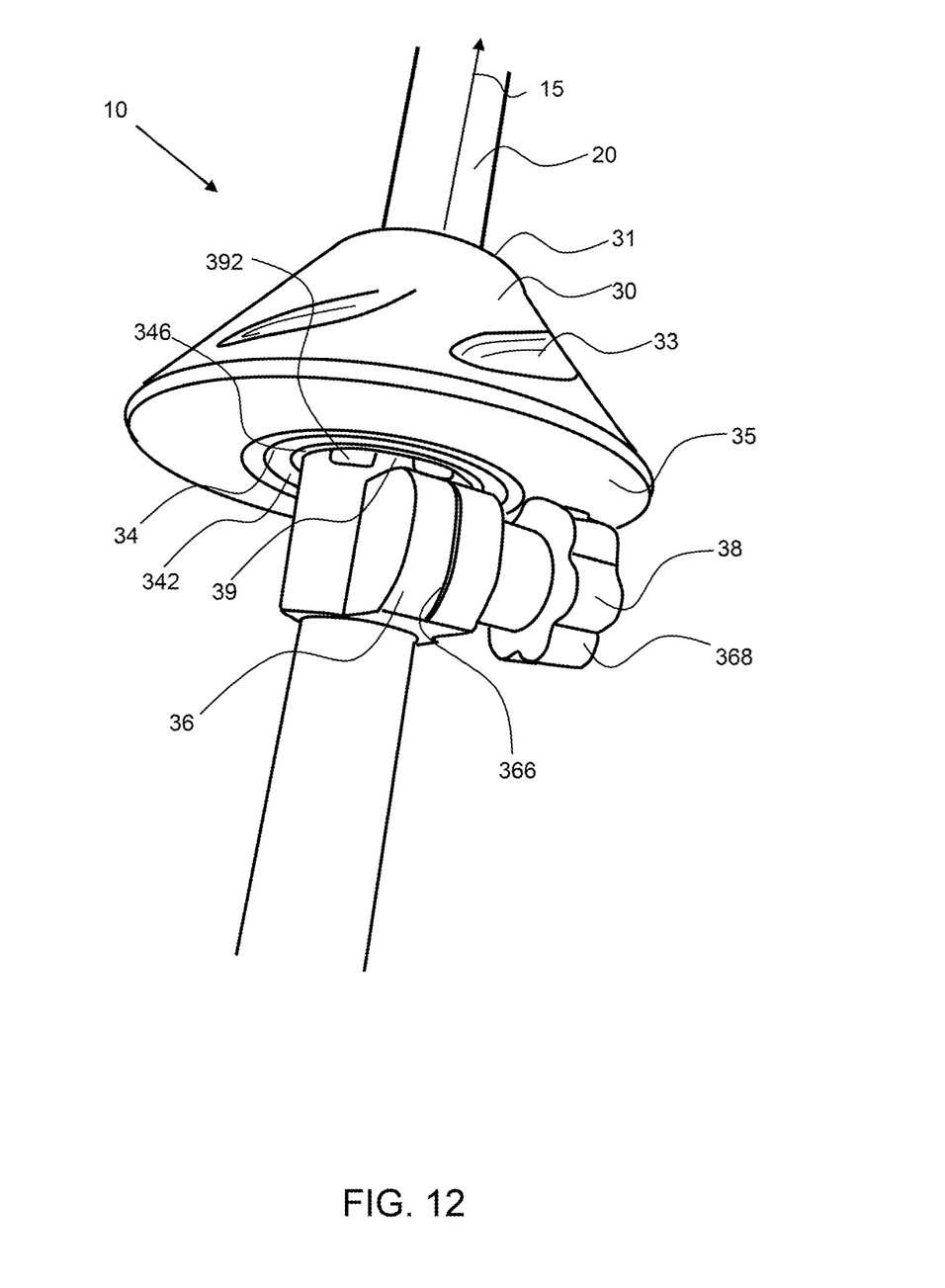
FIG. 12 shows a perspective view of an exemplary bottom filter retainer configured on a rod and retained in position on the rod by a support setter having slip teeth that engage with the bottom of the conical retainer, such as on the bearing of the bottom filter retainer.
Figure 13:
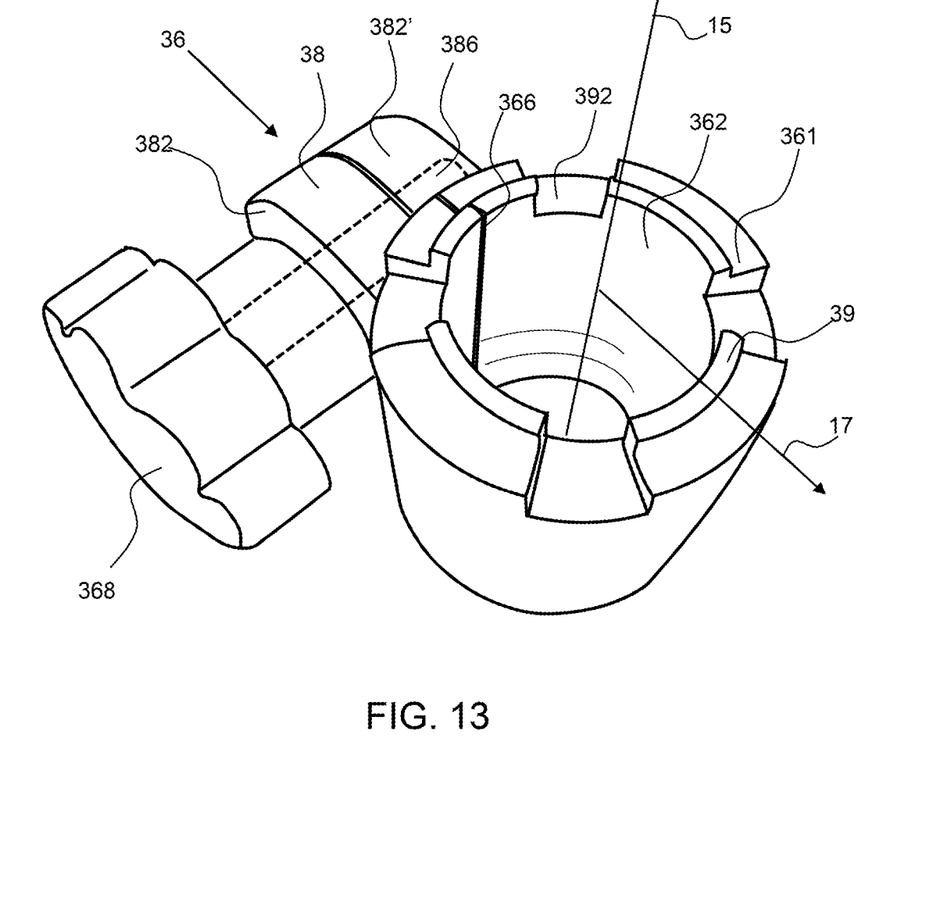
FIG. 13 shows a perspective view of an exemplary support setter having a rod receiver portion for receiving a rod or for sliding down over a rod, and a clamp comprising a clamp knob that when tightened reduces a separation in the rod receiver to secure the support setter in a fixed position to the rod.

As shown in FIG. 12, a bottom filter retainer 30 is configured on a support rod 20 and retained in position on the support rod by a support setter 36 that includes a clamp that can be manipulated to tighten the support setter around the support rod. The support setter has slip teeth 39 that engage with the bottom of the bottom filter retainer, such as extending onto the bearing 34, and preferably extending between the bearing and the support setter to enable the conical retainer 32 portion of the bottom filter retainer to spin freely about the bearing without contact with the support setter. The bearing may include ball bearings 342 configured within a bearing race 346 to enable smooth low friction spinning of the pool filter. The interference fit of the slip teeth extending between the inside surface of the bearing, or bearing race, and the support rod, ensures that the bottom filter retainer is secured firmly in position to provide smooth movement of the conical retainer with the pool filter resting thereon. The weight of the pool filter on the slip teeth may press the slip teeth against the support rod to clamp the slip teeth against the support rod to hold the support setter in position on the support rod. The slip teeth or other portion of the support setter may be configured to rest on a portion of the bearing 34 such as a race of the bearing to prevent contact with the conical retainer portion of the bottom filter retainer. The support setter has clamp ports 392, as best shown in FIG. 13, configured between the slip teeth to allow water and debris to flow therethrough from the interior of the pool filter during cleaning. The support setter 36 comprises a rod receiver aperture 362 and a clamp 38 including a clamp knob 368 that can be tightened to reduce a separation 366 in the support setter to retain the support setter on the rod.

As shown in FIG. 13, an exemplary support setter 36 has a rod receiver 361 having a rod receiver aperture 362 for receiving a support rod therethrough. The support setter also has a clamp 38 comprising a clamp knob 368 that when tightened reduces a separation 366 in the rod receiver to secure the support setter in a fixed position to the rod. The clamp knob is coupled with a fastener 386, such as a bolt that pulls the second clamp portion 382' toward the first clamp portion 382. The fastener extends across the separation 366 from the first clamp portion to the second clamp portion. The support setter has slip teeth 39 that extend vertically up from the rod receiver 361 portion of the support setter, along the vertical axis or along the length of the support rod. Again, the slip teeth may be configured to fit between the support rod and the inside of the bearing, such as along the inside surface of the bearing or bearing race. The slip teeth have a radial thickness, extending along the radial axis 17, that is less than the radial thickness of the rod receiver portion 361, or collar, of the support setter 36 to enable the slip teeth to fit between the support rod and the inside surface of the bearing. These radially thinner slip teeth are configured to fit within an annulus between the bearing and the support rod. The slip teeth form clamp ports 392, or openings between the slip teeth for water and debris to flow through when cleaning a pool filter. The water and debris are configured to flow through the interior of the bottom filter retainer, through the interior drainage feature 330, or channel or groove in the bottom filter retainer, as shown in FIG. 10, and then through the clamp ports 392.

Figure 14:
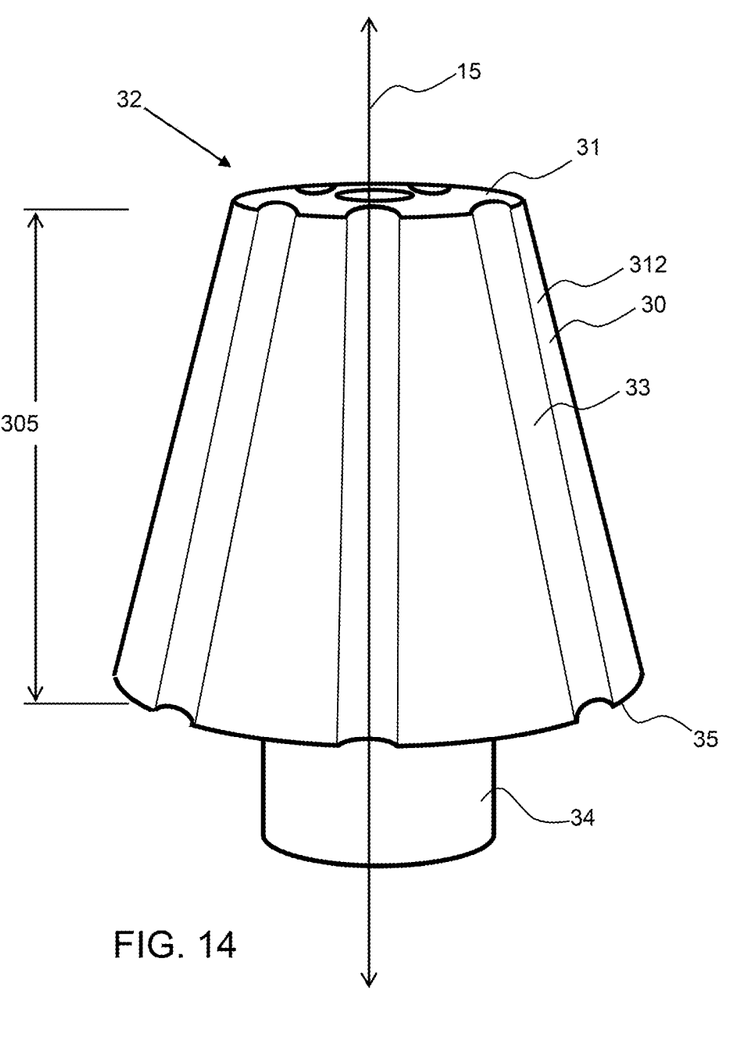
FIG. 14 shows a side view of an exemplary bottom filter retainer having drainage slots that extend along the length of the outside of the conical retainer.

As shown in FIG. 14, a conical retainer 32 tapers from a bottom 35 to a top 31 thereby enabling insertion into a pool filter aperture of varying size. Also, the exemplary conical retainer 32 has drainage slots 33 extending from the top to the bottom to enable water and debris from inside the filter to be drained out during cleaning. Otherwise, dirty water from the water passing through the filter may collect inside of the filter and prevent proper cleaning and increase the weight of the filter. A bottom filter retainer may have a height 305, that extends along the conical retainer 32 portion and the drainage slots may extend along the height or vertical axis 15 of the bottom filter retainer along the outside surface 312 of the conical retainer 32.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A method of cleaning a pool filter comprising:
a) providing a pool filter having a filter aperture;
b) providing a portable pool filter cleaning assembly comprising:
i) a support rod extending from a top to a bottom;
ii) a bottom filter retainer configured on the support rod and comprising:
a conical retainer comprising;
a rod receiver configured through the conical retainer and configured to receive said support rod;

an interior drainage feature configured along said rod receiver of the conical retainer and configured to drain water from the interior of the pool filter; and a drainage slot configured in an outside surface of the conical retainer and configured to drain water from the interior of the pool filter; and a bearing configured between the support rod and the conical retainer;

wherein the portable pool filter cleaning assembly is configured to retain said pool filter on the support rod with the conical retainer extending into said filter aperture of the pool filter;

c) placing said pool filter on the support rod with a pool filter aperture retained over the conical retainer with the drainage slot extending up into pool filter aperture;

d) spraying the pool filter with a stream of water to cause the pool filter to rotate about the support rod and thereby clean the pool filter with water passing through the pool filter to an interior of the pool filter and draining from the interior of the pool filter, through both said drainage slot and through the interior drainage feature of the bottom filter retainer.

2. The method of cleaning a pool filter of claim 1, wherein the portable pool filter cleaning assembly further comprises a support setter comprising a rod receiver portion having a rod receiver aperture configured to receive said support rod therethrough and a clamp configured to secure the support setter in a fixed position to the support rod;

wherein the method further comprises securing the support setter to said support rod and configuring the bottom filter retainer on the support setter.

3. The method of cleaning a pool filter of claim 2, wherein the support setter further comprises a separation and a clamp knob configured to reduce said separation in the support setter to secure the support in a fixed position to the support rod.

4. The method of cleaning a pool filter of claim 3, wherein the support setter further comprises slip teeth that extend between the support rod and the bearing.

5. The method of cleaning a pool filter of claim 4, wherein the support setter comprises clamp ports configured between the slip teeth and configured to allow water to drain from the interior of the pool filter from the interior drainage feature of the bottom filter retainer through the clamp ports.

6. The method of cleaning a pool filter of claim 1, wherein the drainage slot extend along a height of an outside surface of the conical retainer.

7. The method of cleaning a pool filter of claim 6, wherein the conical retainer comprises a top and a bottom and wherein the drainage slot extend from said top to said bottom of the conical retainer.

8. The method of cleaning a pool filter of claim 1, wherein the drainage slot extending circumferentially along an outside surface of the conical retainer.

9. The method of cleaning a pool filter of claim 1, wherein the bottom filter retainer is detachably attachable to the support rod.

10. The method of cleaning a pool filter of claim 1, wherein the portable pool filter cleaning assembly further comprises a top filter retainer that is detachably attachable to the support rod and wherein the method further comprises configuring the top filter retainer on the support rod to secure the pool filter on the support rod between said top filter retainer and the bottom filter retainer.

11. The method of cleaning a pool filter of claim 1, wherein the support rod has a spike on said bottom and wherein the method further comprises inserting the support rod into a ground surface by inserting said spike into said ground surface.

12. The method of cleaning a pool filter of claim 11, wherein the portable pool filter cleaning assembly further comprises a stand configured to receive said bottom of the support rod to retain the support rod in said substantially vertical orientation within 25 degrees of a vertical axis; and wherein the method further comprises inserting the bottom of the support rod into said stand to retain the support rod in a substantially vertical orientation.

13. The method of cleaning a pool filter of claim 12, wherein the stand further comprises a rod receiver comprising a cylinder configured to receive the bottom of the support rod therein, and wherein the method further comprises inserting the bottom of the support rod into the rod receiver.

14. The method of cleaning a pool filter of claim 13, wherein the stand comprises a stand base that has a planar bottom and wherein the rod receiver extends up from said stand base.

15. The method of cleaning a pool filter of claim 1, wherein the portable pool filter cleaning assembly further comprises a stand comprising:
 a) a stand base having a planar bottom;
 b) a rod receiver comprising a cylinder extending up from the stand base;
 wherein the rod receiver is configured to receive said bottom of the support rod to retain the support rod in said substantially vertical orientation within 25 degrees of a vertical axis; and
 wherein the method further comprises inserting the bottom of the support rod into said stand to retain the support rod in a substantially vertical orientation.

16. The method of cleaning a pool filter of claim 1, wherein the portable pool filter cleaning assembly further comprises a stand comprising:
 a) a plurality of support legs;
 b) a stand aperture configured to receive the bottom of the support rod therethrough and to retain the support rod in said substantially vertical orientation within 25 degrees of a vertical axis; and
 wherein the method further comprises inserting the bottom of the support rod through said stand aperture to retain the support rod in a substantially vertical orientation.

17. A portable pool filter cleaning assembly comprising:
 a) a support rod extending from a top to a bottom;
 b) a bottom filter retainer configured on the support rod and comprising:
  i) a conical retainer comprising;
  ii) a rod receiver configured through the conical retainer and configured to receive said support rod;
  iii) an interior drainage feature configured along said rod receiver and configured to drain water from the interior of the pool filter;
  iv) a drainage slot configured in an outside surface of the conical retainer and configured to drain water from the interior of the pool filter;
  v) a bearing configured between the support rod and the conical retainer
  wherein the portable pool filter cleaning assembly is configured to retain a pool filter on the support rod with the conical retainer extending into a filter aperture of the pool filter; and wherein said pool filter is configured to spin about the support rod from a stream of water onto the pool filter.

18. The portable pool filter cleaning assembly claim 17, wherein the bearing comprises ball bearings and a bearing race.

19. The portable pool filter cleaning assembly claim 17, wherein the portable pool filter cleaning assembly further comprises a support setter comprising a rod receiver portion having a rod receiver aperture configured to receive said support rod therethrough and a clamp configured to secure the support setter in a fixed position to the support rod.

20. The portable pool filter cleaning assembly claim 19, wherein the support setter further comprises a separation and a clamp knob configured to reduce said separation in the support setter to secure the support in a fixed position to the support rod.

21. The portable pool filter cleaning assembly claim 20 wherein the support setter further comprises slip teeth that extend between the support rod and the bearing.

22. The portable pool filter cleaning assembly claim 21, wherein the support setter comprises clamp ports configured between the slip teeth and configured to allow water to drain from the interior of the pool filter from the interior drainage feature of the bottom filter retainer through the clamp ports.

23. The portable pool filter cleaning assembly claim 17, wherein the drainage slot extend along a height of an outside surface of the conical retainer.

24. The portable pool filter cleaning assembly claim 23, wherein the conical retainer comprises a top and a bottom and wherein the drainage slot extend from said top to said bottom of the conical retainer.

25. The portable pool filter cleaning assembly claim 17, wherein the drainage slot extending circumferentially along an outside surface of the conical retainer.

26. The portable pool filter cleaning assembly claim 17, wherein the bottom filter retainer is detachably attachable to the support rod.

27. The portable pool filter cleaning assembly claim 17, wherein the portable pool filter cleaning assembly further comprises a top filter retainer that is detachably attachable to the support rod and the top filter retainer is configured to secure the pool filter on the support rod with the pool filter between said top filter retainer and the bottom filter retainer.

28. The portable pool filter cleaning assembly claim 17, wherein the support rod comprises a spike on said bottom and wherein the spike is configured for inserting the support rod into a ground surface by inserting said spike into said ground surface.

29. The portable pool filter cleaning assembly claim 28, wherein the portable pool filter cleaning assembly further comprises a stand configured to receive said bottom of the support rod to retain the support rod in a substantially vertical orientation within 25 degrees of a vertical axis.

30. The portable pool filter cleaning assembly claim 29, wherein the stand further comprises a rod receiver comprising a cylinder that is configured to receive the bottom of the support rod therein.

31. The portable pool filter cleaning assembly claim 30, wherein the stand comprises a stand base that has a planar bottom and wherein the rod receiver extends up from said stand base.

32. The portable pool filter cleaning assembly claim 17, wherein the portable pool filter cleaning assembly further comprises a stand comprising:
a) a stand base having a planar bottom; and
b) a rod receiver comprising a cylinder extending up from the stand base;
wherein the rod receiver is configured to receive said bottom of the support rod to retain the support rod in a substantially vertical orientation within 25 degrees of a vertical axis.

33. The portable pool filter cleaning assembly claim 17, wherein the portable pool filter cleaning assembly further comprises a stand comprising:
a) a plurality of support legs; and
b) a stand aperture configured to receive the bottom of the support rod therethrough and to retain the support rod in a substantially vertical orientation within 25 degrees of a vertical axis.

* * * * *